United States Patent [19]

Cornett, III et al.

[11] 3,977,553
[45] Aug. 31, 1976

[54] UNITARY THERMOPLASTIC CONTAINER HAVING BREAKAWAY CAP WHICH PROTECTS STERILE INTERIOR ACCESS BARRIER

[75] Inventors: Walter G. Cornett, III, Wilmette; Donald G. Gaspar, Burbank, both of Ill.

[73] Assignee: Respiratory Care, Inc., Arlington Heights, Ill.

[22] Filed: July 23, 1975

[21] Appl. No.: 598,215

Related U.S. Application Data

[62] Division of Ser. No. 448,684, March 6, 1974, Pat. No. 3,936,264, which is a division of Ser. No. 338,878, March 7, 1973, Pat. No. 3,851,029.

[52] U.S. Cl. ............................. 215/32; 215/249; 222/541
[51] Int. Cl.² .......................................... B65D 1/02
[58] Field of Search .............. 215/32, 33, 249, 251; 220/276; 222/541

[56] References Cited

UNITED STATES PATENTS

| | | |
|---|---|---|
| 2,372,182 | 3/1945 | Barr ........................................ 215/33 |
| 3,394,831 | 7/1968 | Bathish .................................. 215/249 |
| 3,509,879 | 5/1970 | Bathish ............................. 215/32 UX |

*Primary Examiner*—Donald F. Norton
*Attorney, Agent, or Firm*—Eric P. Schellin; H. Karl Saalbach

[57] ABSTRACT

There is disclosed herein a method for blow molding a bottle, for instance, from a tube of thermoplastic material. The method includes filling such a container, if desired, with a fluid prior to sealing of the bottle. The bottle has at least one orifice which may be sealed with an integral membrane and a further protective cap is integrally molded with the bottle. Apparatus is also disclosed for molding, filling and sealing such bottles in one operation from a tube a thermoplastic material which has relatively movable mold parts.

8 Claims, 15 Drawing Figures

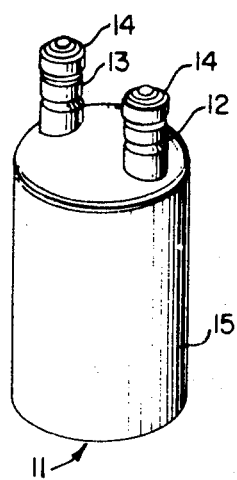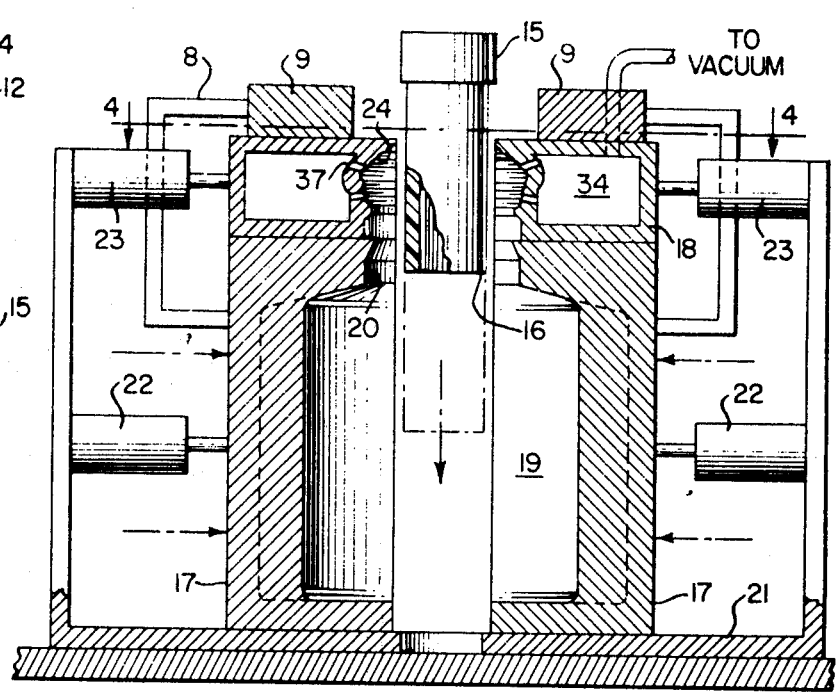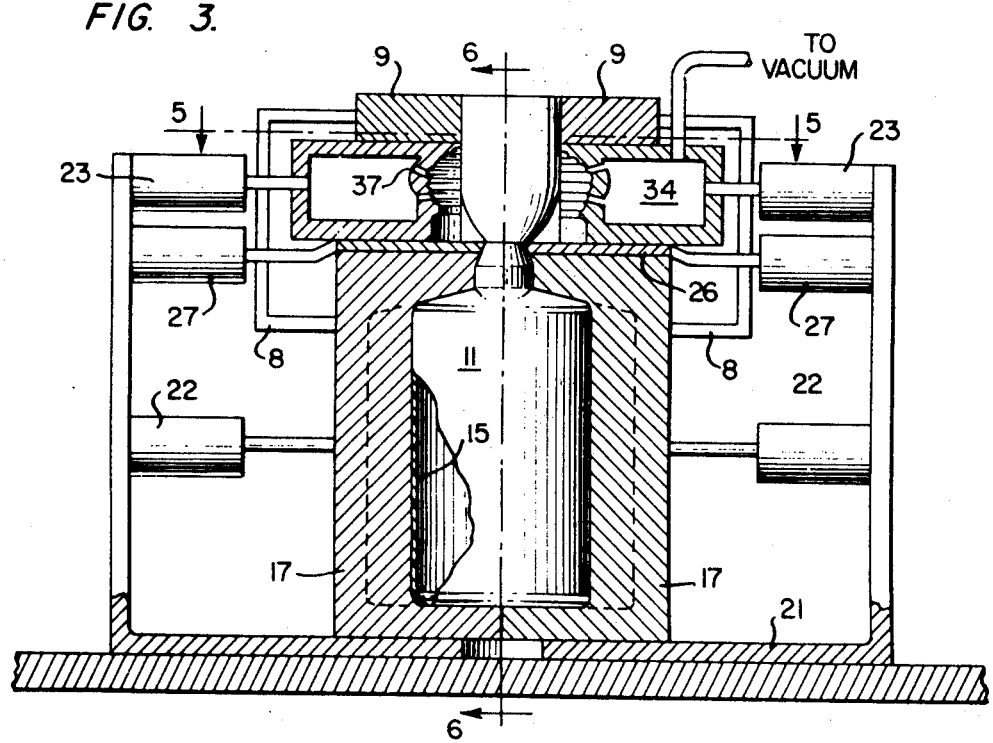

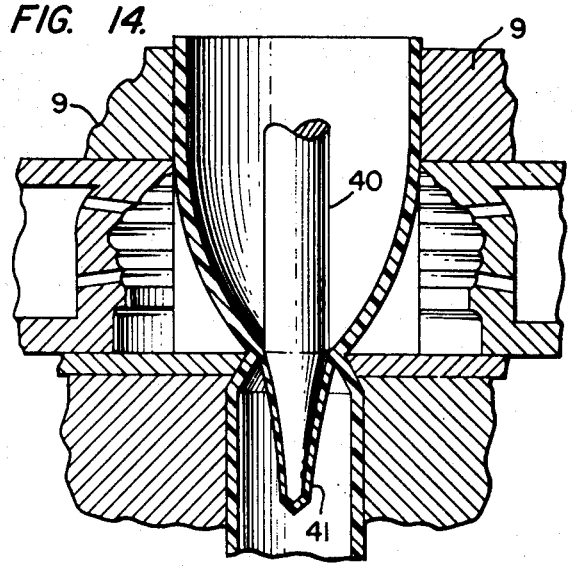
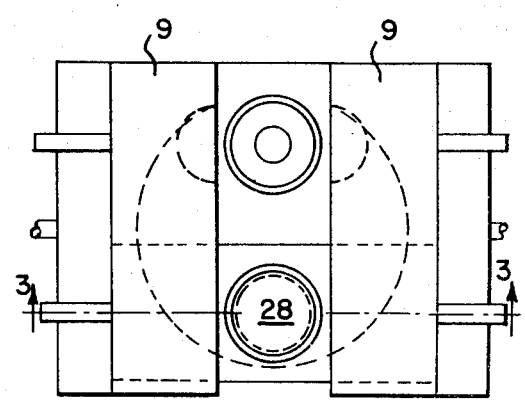
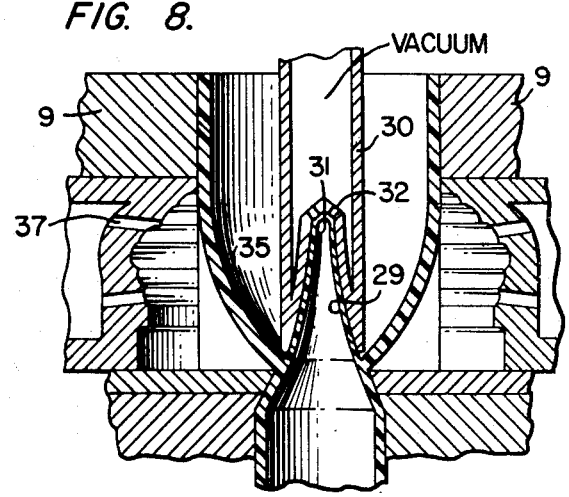
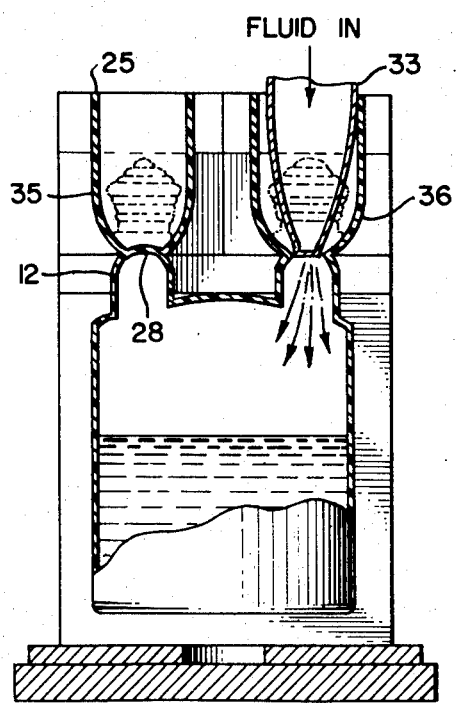
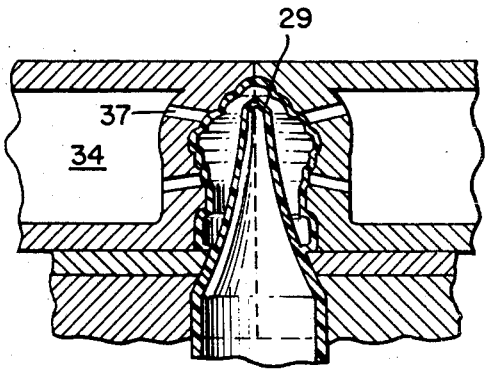

UNITARY THERMOPLASTIC CONTAINER HAVING BREAKAWAY CAP WHICH PROTECTS STERILE INTERIOR ACCESS BARRIER

This is a division of application Ser. No. 448,684, filed Mar. 6, 1974, now U.S. Pat. No. 3,936,264, which is a division of Ser. No. 338,878, filed Mar. 7, 1973, now U.S. Pat. No. 3,851,029.

BACKGROUND OF THE INVENTION

There has been considerable activity in the blow molding of bottles constructed of thermoplastic materials such as polyethylene and polypropylene. These bottles are conventionally blow molded and then filled. Finally they are capped. Most of the prior art has dealt with such bottles wherein they are filled at a much later date after filling.

Of fairly recent vintage is the concept of blow molding a bottle in a conventional manner and then filling the bottle with a fluid material while the bottle is retained in the mold. The bottle is integrally sealed with thermoplastic material after filling. The seal is usually a breachable membrane or a cap which may be broken away along a weakened part line. The attractiveness in this manner of fabrication resides in the fact that the contents in the bottle are admitted when sterile and are then sealed therein in a sterile condition. The bottle has not been exposed to ambient conditions prior to filling so that organisms have not had the opportunity to invade the interior of the bottle.

The mode of operation and the apparatus therefor of a prior art technique can be seen in U.S. Pat. No. 3,325,860. This patent discloses the general concept of blow molding and filling a thermoplastic bottle prior to integrally sealing. The present invention is an ingenious improvement over such prior art disclosure.

SUMMARY OF THE INVENTION

This invention relates, generally, to a method and apparatus for molding, filling and sealing a container made of thermoplastic material in a single continuous operation. The apparatus has an extrusion head which extrudes thermoplastic tubing a section of which, whilst still hot and relatively soft, is enclosed in a sectional mold. A fluid under pressure is supplied internally with respect to the extruded tubing in the mold to thereby distend the tube into contact with the mold surface to form a container. It will be appreciated that the fluid under pressure may be the material with which the container is to be filled or it may be, for example, a gas which is subsequently displaced from within the container when the material with which the container is to be filled is supplied to the blown container. The container has at least initially formed therewith two necks, each having an integrally breakaway cap. At least one of the necks terminates in a breachable seal which may have an outwardly extending or inwardly extending cone-like configuration. The breachable seal is then encompassed with a cap. The seal and caps are integrally molded by the apparatus herein disclosed and by the method herein also taught.

BRIEF DESCRIPTION OF THE DRAWINGS

One example of an apparatus constructed in accordance with the invention is illustrated in the accompanying drawings in which:

FIG. 1 is a perspective view of a bottle produced by practicing the instant invention.

FIG. 2 is a cross-sectional view of the apparatus of the present invention taken along line 2—2 of FIG. 4 with the mold in an open position.

FIG. 3 is a cross-sectional view of the apparatus taken along line 3—3 of FIG. 5 and along the same plane as in FIG. 2 wherein the main mold is in a closed position and a pinch means has operated.

FIG. 5 is a view taken along line 5—5 of FIG. 3.

FIG. 6 is a cross-sectional view taken along line 6—6 of FIG. 3.

FIG. 8 is a similar view as in FIG. 7.

FIG. 9 is a similar view as in FIGS. 7 and 8.

FIG. 14 is another embodiment of the arrangement of FIGS. 8 and 10.

DETAILED CONSIDERATION OF THE INVENTION

Figure 12:
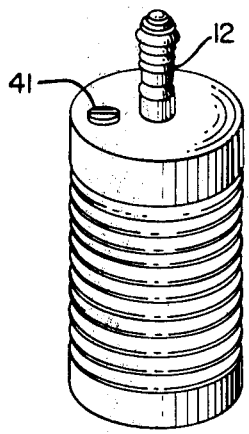
FIG. 12 is a perspective view of another embodiment of a bottle constructed in accordance with the present invention.

Attention is now directed to FIG. 1, in which a thermoplastic container 11 is shown having two necks 12 and 13, respectively, displaced from the axis of the container. The necks terminate in caps 14 on each. In the embodiment shown in FIG. 1 the body 15 of the container has a cylindrical configuration. It is pointed out that the body of the container may have any one of a wide number of configurations, unusual shapes and designs. The design of the body of the container is only limited by the molds used and by the thermoplastic material employed. With regard to the thermoplastic materials, a wide range of such materials are contemplated as coming within the purview of the invention, for instance, polyethylene and polypropylene. It will also be noted that the container illustrated in FIG. 12 is a perspective view of another embodiment of the present invention wherein only one neck is provided in the resultant.

The container of the present invention is blow molded in sectional molds from an extruded hot thermoplastic tube. Attention is now directed to FIG. 2 wherein a conventional nozzle 15 extrudes a tube 16 of thermoplastic material such as polyethylene material. The tube 16 proceeds between a group of sectional molds. The main sectional molds 17 are located below the upper sectional molds 18. The main molds each have a large cavity 19 designed to constrain the thermoplastic material to form the body of the container. The main molds 17 also have a pair of smaller cavities 20 to form the necks 12 and 13. The main molds are slidably positioned on flat surface 21. They are propelled to and fro by suitably positioned cylinder and piston means 22 operated with a fluid.

Figure 4:
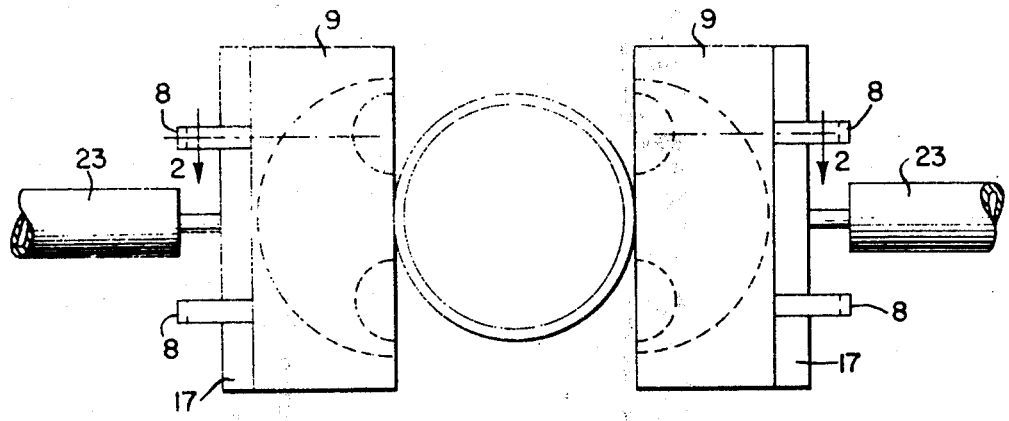
FIG. 4 is a view taken along line 4—4 of FIG. 2.

As in a normal blow molding operation, the main mold is rapidly closed on the thermoplastic tube which is continuously extruded. When the molds are closed the extruded parison is cut off and the molds are transferred to the blow molding and filling station. The view shown by FIG. 4 shows the thermoplastic tube 16 between the pair of upper sectional molds 18 with the main mold sections still in the open mode. The upper sectional molds are also driven by an appropriate hydraulic means 23. The upper sectional molds each have a cavity 24 designed to vacuum form a cap for the container. In the FIG. 2 as depicted the cap would be identified by reference numeral 14 in FIG. 1.

In FIG. 5, the main molds 17 have closed on the tube 16, thereby both pinching off and closing the bottom, as shown in FIG. 3. The closing of the main molds also pinches off the top of the tube, thereby leaving two upwardly standing neck portions. The uppermost portion of the necks has been cut at 25 as illustrated by FIG. 6, for instance. The two upwardly standing neck portions are held in position by vacuum holding jaws 9 positioned above molds 18. The holding jaws are connected to the molds 17 by means of brackets 8, for instance, and are therefore designed to move with molds 17.

Figure 7:
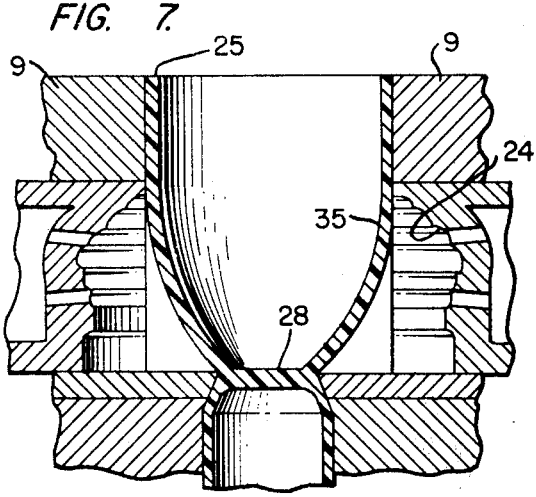
FIG. 7 is a fragmentary close-up view in cross section as in FIG. 3.

When the main mold sections have been closed as in FIG. 3 and the respective necks have been formed as shown in FIG. 6: a slidable pinching means 26, shown in FIGS. 3 and 5 move between the main mold and the upper mold under the aegis of fluid operated piston and cylinder means 27 to bring together a slug 28 of thermoplastic material at the top portion of neck 12. Of course, it is contemplated that other means may be employed to urge pinching means into operative position. The slug 28 in cross section can be seen in a number of Figures, for example, FIGS. 6, 7 and 13. The top plan view of FIG. 5 also depicts the slug 28. The pinching of neck 12 effectively closes the neck. The other neck 13 remains open so that a nozzle 33 is positioned therein in the manner shown in FIG. 6 in order to introduce the gas, such as air, to blow mold the main body of the container and to complete the molding of the neck. The pressure of the air against the still hot thermoplastic material forces the material against the cavity walls. As the blow molding is completed the same nozzle is utilized to introduce a quantity of liquid, that is, the container is filled to a desired degree. The procedure of blow molding and filling is further exemplified in U.S. Pat. No. 3,325,860.

As the container is blow molded and filled or soon after the completion thereof, the slug 28 may be shaped to form a cone 29. Turning to FIG. 8, for instance, a tube 30, having an internally positioned opposing cone-like cavity 31 having perforations 32 is brought into position by suitable means to the upper surface of the slug 28. By applying a vacuum to the tube and combined with the positive pressure in the body of the container the slug is deformed into the cone configuration shown in FIG. 8.

Upon the completion of the formation of the cone 29 and the filling operation, the appropriate nozzle 33 and tube 30 are withdrawn. The upper sectional molds 18 are closed. As the upper sectional molds are closed a vacuum is drawn in chambers 34, as a result the remaining extension portions 35 and 36 above necks 12 and 13, respectively are drawn into the respective cavities 24 due to a plurality of perforations 37. The upper sectional molds thereby pinch closed the upper portions 35 and 36 and form a cap 14 about the cone 29 which is displaced therefrom.

The latter operation essentially completes the formation of the container of the present invention. The neck 12 terminates in a closed cone about which a cap 14 is positioned. The other neck merely possesses a cap having essentially the same configuration as the cap about the cone. Both caps have been molded whereby the thermoplastic material at the locale where they join the top of the neck is quite thin. This thinness is designed to make it possible to easily breakaway the cap. Of course, when the cap above neck 13 is broken off access to the interior of the container is thereby provided. On the other hand, breaking away the cap above neck 12 still does not provide access to the interior of the body 15 of the container 11 as one is still confronted with the cone. This is desirable as the underlying cone is maintained in a sterile clean condition as long as the cap has not been removed. As the temperature during the forming of the cone and the container is higher than bacteria and other organisms can tolerate, the thermoplastic is sterile. To obtain access to the contents of the container through the cone, the cone must be punctured. In use, it may be desirable to break-off the cap surrounding the cone; then puncture the cone; and then follow this with attaching a flexible conduit, for instance. The cap above neck 13 may be broken away, if desired, to equalize pressure conditions.

Figure 10:
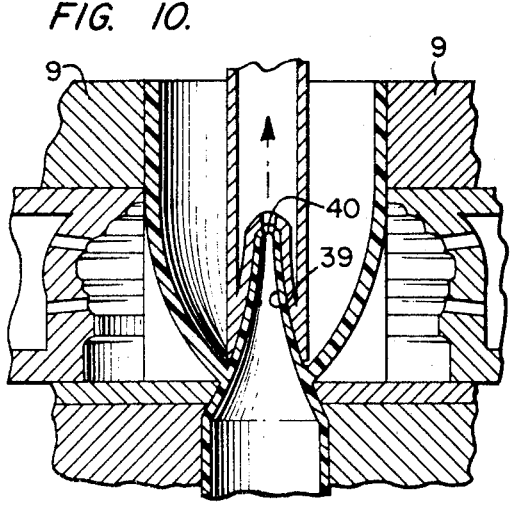
FIG. 10 is another embodiment of the arrangement of FIG. 8.
Figure 11:
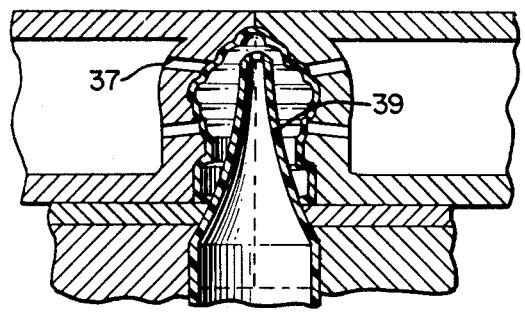
FIG. 11 is a similar view as in FIG. 10.

In another embodiment as shown in FIGS. 10 and 11, the cone 39 may be punctured with a preformed aperture 40 during the formation of the cone. This can be accomplished by having an axially disposed opening in the cavity of the tube through which a sufficiently large vacuum may be applied to burst the end of the cone to form an aperture. FIG. 11 shows the resultant after the cap has been formed by the upper sectional molds. It is also contemplated that the opening may be made by a means having a sharp point.

Figure 13:
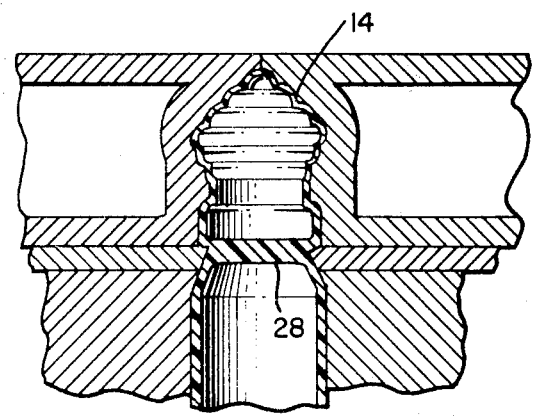
FIG. 13 is a similar view as in FIG. 7.

In another embodiment, as shown by FIG. 13, no cone is formed, but rather the slug 28 is left as originally formed and the cap thereabove is formed. This last embodiment is useful when the slug is to be employed as a breachable seal. A sharp cannula may be used to puncture the slug, after the cap 14 has been removed, in order to introduce material or to remove material.

Figure 15:
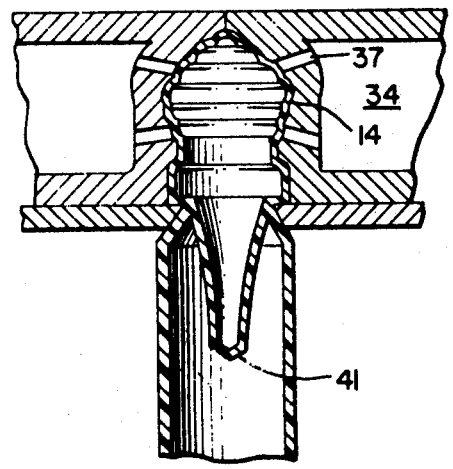
FIG. 15 is a similar view as in FIG. 14.

Another embodiment within the purview of the inventive concept is the creation of an inverted cone which extends downwardly into neck 12. This can be accomplished by employing a pointed rod which deforms slug 28 inwardly. Illustrative of this concept is FIG. 14 and the resultant as shown in FIG. 15. It will be noted that a pointed rod 40 is used to deform the slug 28 into an inverted cone 41. FIG. 15 shows the cap 14 in position.

As neck 13 is primarily employed for the introduction of material, liquid or gas, for instance, it is possible to completely eliminate the neck 13 when there is no need therefor. With regard thereto attention is directed to FIG. 12. Neck 12 is positioned axially with respect to a cylindrical container. The other neck has been pinched off at 42 and the surface is sealed to leave only a vestige of the neck. It will be seen that the body of the container is corrugated so that it may be collapsed axially. When the cap is broken off and the underlying cone has been or is punctured the contents in the container may be retrieved by squeezing the container to collapse it and the contents will be dispensed through the cone having an aperture.

What is claimed is:

1. A container fabricated from thermoplastic material comprising:
   a body;
   said body having at least one neck;

said neck terminating at its end distal from said body with a continuous breachable sealing membrane;

a cap covering said breachable sealing membrane;

the edges of said cap being joined to the edges of said continuous breachable sealing membrane and to the distal end of said neck;

said cap having a weakened portion between the portion of said cap proximal to said breachable sealing membrane and the portion of said cap distal thereto, whereby said distal portion of said cap may be readily broken away, by rupturing of said weakened portion, thereby exposing said breachable sealing membrane;

said body, neck, breachable sealing membrane and said cap being unitary and consisting entirely of one piece of homogeneous thermoplastic material.

2. The container of claim 1 wherein the breachable sealing membrane has an outwardly extending cone configuration.

3. The container of claim 1 wherein the breachable sealing membrane has a deformed configuration extending into the neck.

4. Subject matter under claim 1 in which the interior surfaces and volumes of the container, on either side of the breachable sealing membrane, are, while the cap remains whole and unbroken, sterile.

5. A container fabricated from thermoplastic material comprising:

a body;

said body having at least one neck;

said neck terminating at its end distal from said body with an apertured separation member;

a cap covering said apertured separation member;

the edges of said cap being joined to the edges of said apertured separation member and to the distal end of said neck;

said cap having a weakened portion between the portion of said cap proximal to said apertured separation member and the portion of said cap distal thereto, whereby said distal portion of said cap may be readily broken away, by rupturing of said weakened portion, thereby exposing said apertured separation member;

said body, neck, apertured separation member and said cap being unitary and consisting entirely of one piece of homogeneous thermoplastic material.

6. The container of claim 5 wherein the apertured separation member has an outwardly extending cone configuration.

7. The container of claim 5 wherein the apertured separation member has a deformed configuraion extending into the neck.

8. Subject matter under claim 5 in which the interior surfaces and volumes of the container, including both surfaces of the apertured separation member, are, while the cap remains whole and unbroken, sterile.

* * * * *